(12) United States Patent
Nordstrom et al.

(10) Patent No.: US 7,023,908 B2
(45) Date of Patent: Apr. 4, 2006

(54) DSL TRANSMISSION SYSTEM WITH FAR-END CROSSTALK COMPENSATION

(75) Inventors: Tomas Nordstrom, Luleå (SE); Daniel Bengtsson, Luleå (SE); Olivier Isson, La Tronche (FR)

(73) Assignees: STMicroelectronics S.A., Gentilly (FR); STMicroelectronics NV, Amsterdam (NL)

( * ) Notice: Subject to any disclaimer, the term of this patent is extended or adjusted under 35 U.S.C. 154(b) by 695 days.

(21) Appl. No.: 09/736,790

(22) Filed: Dec. 14, 2000

(65) Prior Publication Data
US 2001/0004383 A1 Jun. 21, 2001

(30) Foreign Application Priority Data
Dec. 14, 1999 (EP) ................. 99410173

(51) Int. Cl.
*H04B 1/38* (2006.01)
(52) U.S. Cl. .................................. 375/222
(58) Field of Classification Search ............ 375/219, 375/220, 221, 222, 260, 296, 261, 345; 379/417, 379/93.01, 24, 206, 40; 378/201, 286; 370/307, 370/203, 210
See application file for complete search history.

(56) References Cited

U.S. PATENT DOCUMENTS

| | | | | |
|---|---|---|---|---|
| 4,769,766 A | * | 9/1988 | Tung | 700/29 |
| 5,181,198 A | | 1/1993 | Lechleider | 370/321 |
| 5,271,037 A | | 12/1993 | Szechenyi | |
| 5,481,565 A | * | 1/1996 | Pal | 375/232 |
| 5,511,119 A | | 4/1996 | Lechleider | 379/414 |
| 5,659,581 A | | 8/1997 | Betts et al. | 375/296 |
| 5,668,472 A | * | 9/1997 | Ohyu | 324/248 |
| 5,787,746 A | * | 8/1998 | Ferreira | 72/11.3 |
| 5,838,383 A | * | 11/1998 | Chimoto et al. | 348/553 |
| 5,887,032 A | | 3/1999 | Cioffi | |
| 5,949,894 A | * | 9/1999 | Nelson et al. | 381/300 |
| 6,125,212 A | * | 9/2000 | Kresch et al. | 382/250 |
| 6,243,476 B1 | * | 6/2001 | Gardner | 381/303 |
| 6,307,889 B1 | * | 10/2001 | Chun | 375/260 |
| 6,317,495 B1 | * | 11/2001 | Gaikwad et al. | 379/417 |
| 6,321,212 B1 | * | 11/2001 | Lange | 705/37 |
| 6,452,981 B1 | * | 9/2002 | Raleigh et al. | 375/299 |
| 6,597,745 B1 | * | 7/2003 | Dowling | 375/296 |
| 6,665,349 B1 | * | 12/2003 | Cherubini et al. | 375/261 |

FOREIGN PATENT DOCUMENTS

WO WO-A-97 06619 2/1997

OTHER PUBLICATIONS

European Search Report from European Patent Application 99410173 1, filed Dec. 14, 1999.
European Search Report from European application No. 99410174.9, filed Dec. 14, 1999.

* cited by examiner

*Primary Examiner*—Emmanuel Bayard
(74) *Attorney, Agent, or Firm*—Lisa K. Jorgenson; James H. Morris; Wolf, Greenfield & Sacks, P.C.

(57) ABSTRACT

The invention relates to a far-end crosstalk canceling circuit for a digital subscriber line transmission system, the transmission system including a plurality of line termination modems transmitting discrete multitone symbols Si to corresponding network termination modems over n transmission channels. The invention multiplies the vector S=(Si) i=1 to n, before transmission, by a precompensation matrix M such that the matrix product H*M is diagonal, H being the transfer matrix of the plurality of downstream transmission channels defined by R=H*S where R=(Ri), i=1 to n, is the vector of the discrete multitone symbols Ri respectively received by the modems.

33 Claims, 4 Drawing Sheets

DSL TRANSMISSION SYSTEM WITH FAR-END CROSSTALK COMPENSATION

BACKGROUND OF THE INVENTION

1. Field of the Invention

The present invention relates to digital subscriber line transmission systems, which allow, in particular, high speed communication on twisted pair telephone lines based on discrete multitone transmission (DMT). The invention relates more specifically to a far-end crosstalk (FEXT) canceller for compensating the crosstalk signal induced by modems located at the far-end of such a transmission system.

2. Discussion of the Related Art

Figure 1:
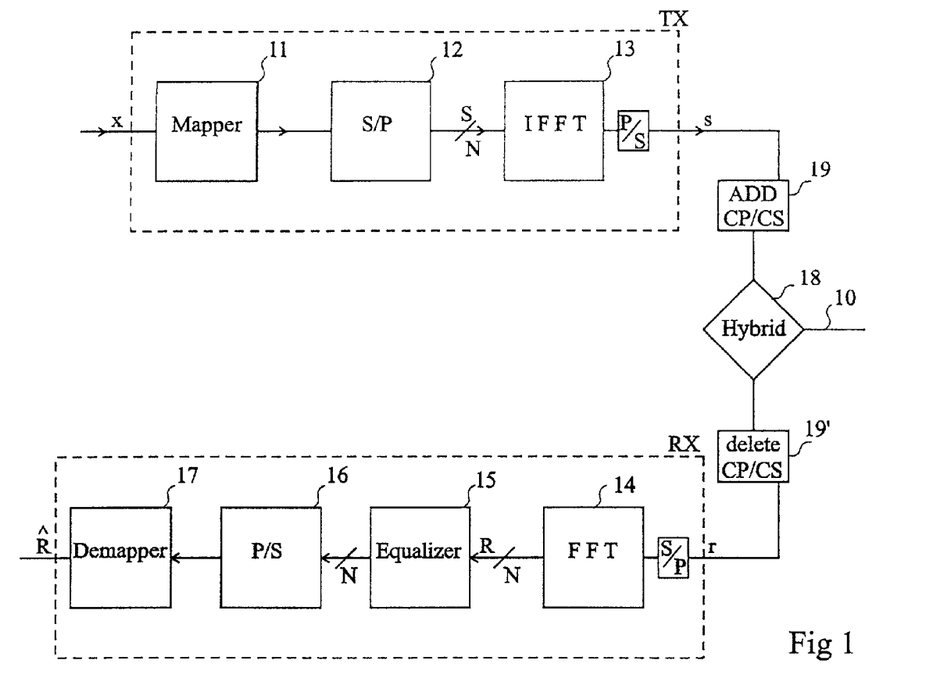
FIG. 1, previously described, schematically shows the structure of a modem suitable for use in a DSL transmission system.

FIG. 1 schematically shows a modem, comprising a transmission (TX) and a reception (RX) section in a conventional DSL transmission system using discrete multitone. A serial stream of data X is provided to a mapper circuit 11 mapping each data into a symbol of a constellation, for example of a QAM (Quadrature Amplitude Modulation) constellation. The mapped values are then transformed into a set S of N components by a serial to parallel converter 12, each component of the set being considered as a frequency domain coefficient. This set of frequency domain coefficients, hereafter also called DMT symbol, is provided to an inverse fast Fourier transform (IFFT) circuit 13 which generates a time domain block of samples and is followed by a parallel/serial converter (P/S). This time domain block is therefore the sum of N sinusoidal subcarriers of different frequencies, the amplitude thereof being determined by the corresponding frequency domain coefficient received by the IFFT circuit.

Each time domain block is cyclically prefixed (cp) and suffixed (cs) in a block 19 to eliminate or at least attenuate the Inter Symbol Interference (ISI) and the Inter Carrier Interference (ICI) caused by the channel, and is transmitted onto a telephone line 10 through a hybrid line interface 18. The line interface 18 also receives incoming time domain blocks from another modem connected to line 10.

At the receiving side, the incoming time domain blocks from line 10 are provided to a fast Fourier transform (FFT) circuit 14 through a block 19' that deletes the prefix and suffix and a serial/parallel converter (S/P) which calculates the N frequency domain coefficients for each block. The N frequency domain coefficients are then provided to an equalizer 15 which compensates for the attenuation and phase shift incurred by each frequency component. The equalized values are then serialized by a parallel to serial converter 16 into a stream of N complex numbers $R(f_j)$ and then processed by a demapper 17 attributing to each $R(f_j)$ the symbol $\hat{S}$ c of the constellation which comes closest thereto. The demapper 17 further outputs the digital word $\hat{X}$ c associated with the selected constellation point $\hat{S}$ c.

Figure 2:
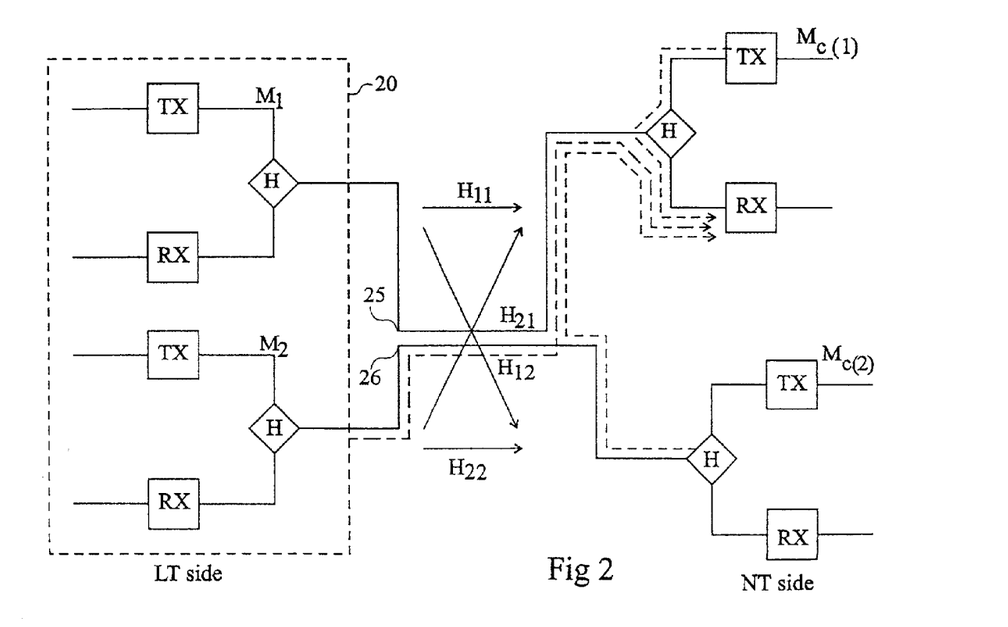
FIG. 2, previously described, schematically shows the different types of noise occurring in a DSL transmission system.

FIG. 2 schematically shows a DSL transmission system including a central office 20 communicating with a plurality of end-users over telephone lines 25, 26. The modems M1, M2, Mc(1), Mc(2) have the structure represented in FIG. 1. The end of a telephone line connected to a modem of the central office is called the line termination (LT) side while the end connected to a modem of an end-user is called the network termination (NT) side.

Ideally, such a DSL transmission system allows the whole frequency band to be used for simultaneous full-duplex transmissions. However, in practice, different sources of noise disturb the transmissions and impede proper reception of data.

For a given modem, three different sources of noise can be distinguished as illustrated on FIG. 2:

- the self-echo, i.e. for a given modem, the parasitic signal from the transmitter TX leaking to the receiver RX through the hybrid interface;
- the near-end crosstalk (NEXT) arising from signals in adjacent telephone lines 25, 26 with opposite transmission directions. More specifically, in the present example, the NEXT generated at the modem Mc(1) is the parasitic signal received by this modem from the modem Mc(2). In this instance the NEXT is called NT-NEXT because the modem Mc(1) is located on the NT side. Reciprocally, the NEXT generated at modem M1 by the modem M2 is called LT-NEXT;
- the far-end crosstalk (FEXT) arises from signals traveling along the same transmission direction in adjacent telephone lines. More precisely, in the illustrated example, the FEXT generated at the modem Mc(1) is the parasitic signal received by this modem from the modem M2 located on the opposite side, due to the coupling between the telephone lines 25 and 26 sharing a common binder. In this instance the FEXT is called NT-FEXT because the modem Mc(1) is located on the NT side. Reciprocally, the FEXT generated at modem M1 by the modem Mc(2) is called LT-FEXT.

Echo-cancellers for canceling self-echoes are known e.g. from U.S. patent application Ser. No. 09/410,636, filed Oct. 1, 1999 and entitled DSL TRANSMISSION SYSTEM WITH ECHO-CANCELLATION, which is incorporated herein by reference.

There is also known from U.S. Pat. No. 5,887,032, which is incorporated herein by reference, a canceller for canceling out the NEXT interference in an ADSL transmission system on the LT side. This canceller operates in the frequency domain and assumes, for a given subcarrier or tone, that the NEXT interference is proportional to the symbol value emitted by the modem transmitting on the interfering channel. The latter value is scaled by a given coefficient and subtracted from the symbol received by the modem suffering from the NEXT interference.

Both self-echo cancellation and LT-NEXT cancellation are possible because the signal transmitted by the same modem (in the case of the self-echo) or by a neighboring modem of the central office (in the case of LT-NEXT interference) is directly available.

FEXT cancellation is however intrinsically more complex than NEXT or self-echo cancellation because the modem transmitting over the interfering channel is now located on the far-end side and the actual values of the interfering symbols are therefore not known.

SUMMARY OF THE INVENTION

An object of the present invention is therefore to design a canceller circuit for a DMT based DSL transmission system capable of significantly removing the FEXT interference and having a simple structure.

It is also an object of the present invention to design an efficient FEXT canceling method in a DMT based DSL transmission system.

These and other objects are achieved by a far-end crosstalk canceling circuit for a digital subscriber line transmission system, said transmission system comprising a plurality of line termination modems transmitting discrete multitone symbols to corresponding network termination modems over a plurality of transmission channels, comprising precompensation means multiplying, before transmission, a vector S=(Si), i=1 to n, by a precompensation matrix such that a matrix product H*M is diagonal, H being a transfer matrix of the plurality of transmission channels defined by R=H*S, where R=(Ri), i=1 to n, is the vector of the discrete multitone symbols Ri respectively received by the modems.

The invention also provides a far-end crosstalk canceling method for a digital subscriber line transmission system, said transmission system comprising a plurality of line termination modems transmitting discrete multitone symbols Si to corresponding network termination modems over n transmission channels, wherein a vector S=(Si), i=1 to n, is multiplied, before transmission, by a precompensation matrix M such that the matrix product H*M is diagonal, H being a transfer matrix of the n transmission channels defined by R=H*S, where R=(Ri), i=1 to n, is the vector of the discrete multitone symbols Ri respectively received by the modems.

The foregoing and other objects, features, aspects and advantages of the invention will become apparent from the following detailed description of embodiments, given by way of illustration and not of limitation with reference to the accompanying drawings.

DETAILED DESCRIPTION

The invention is based on the idea that it is possible to remove FEXT interference at the NT side by appropriately predistorting at the LT side the DMT symbols to be transmitted. More specifically, if S is the vector (Si), i=1 to n, where Si is the DMT symbol to be transmitted by the modem Mi and if R is the vector (Ri), i=1 to n, where Ri is the DMT symbol received by the modem Mc(i), then R=H*S where H is the transfer matrix of the n downstream (i.e. LT to NT) transmission channels.

R and S are vectors of n*N components as concatenation of n vectors of N components, each Si (resp. Ri) being a vector of N frequency (or tone) components Si(fj) (resp. Ri(fj)).

If we assume that there exists a matrix M such that H*M=D where D is diagonal and if the vector S is multiplied by the matrix M before transmission then R=H*M*S=D*S is freed from FEXT interference since any component Ri(fj) of the DMT symbol Ri received by the modem Mc(i) depends only upon the component Si(fj) of the DMT symbol Si transmitted by the modem Mi.

In most practical cases, the transfer matrix H can be inverted and one can simply choose M=H−1 and D=I, where I is unity matrix. This provides a further advantage since equalization of the frequency components of the received DMT symbols is no longer necessary.

Figure 3A:
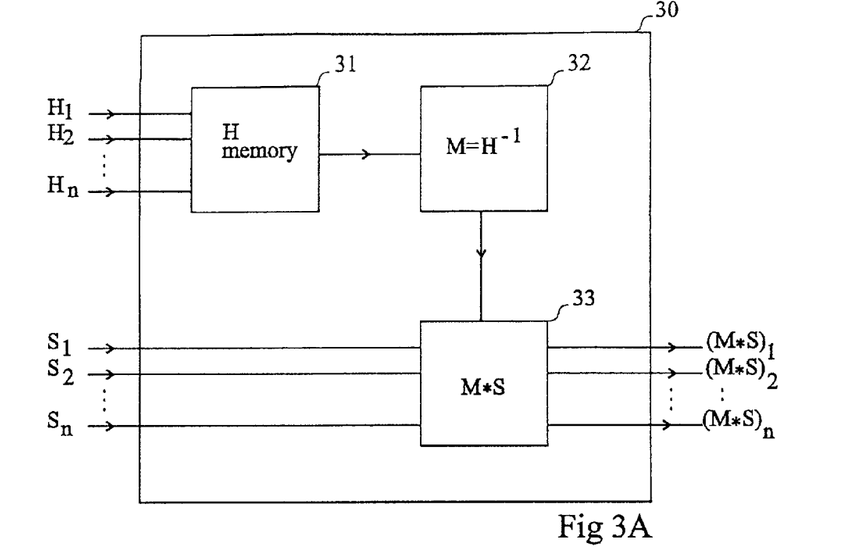
FIG. 3A shows a first embodiment of a FEXT canceller according to the invention.

A FEXT precompensating circuit according to a first embodiment of the invention is hereafter described in connection with FIG. 3A. This circuit comprises a memory 31 in which are stored the columns Hi of the transfer matrix H. The matrix coefficients Hik are then supplied to a matrix inverter 32. A matrix multiplier 33 receives the inverted matrix M=H$^{-1}$ as well as the DMT symbols Si provided by the LT modems Mi and performs the multiplication M*S. The DMT symbols $$(M^*S)_i = (M^*S)_{j+(i-1)*N}, j=1 \text{ to } N,$$

are then respectively supplied to the LT modems Mi. In each LT modem Mi the DMT symbol $(M^*S)_i$ is provided to an IFFT circuit in place of the DMT symbol Si and the resulting time block of samples is transmitted to the NT modem Mc(i).

Figure 6:
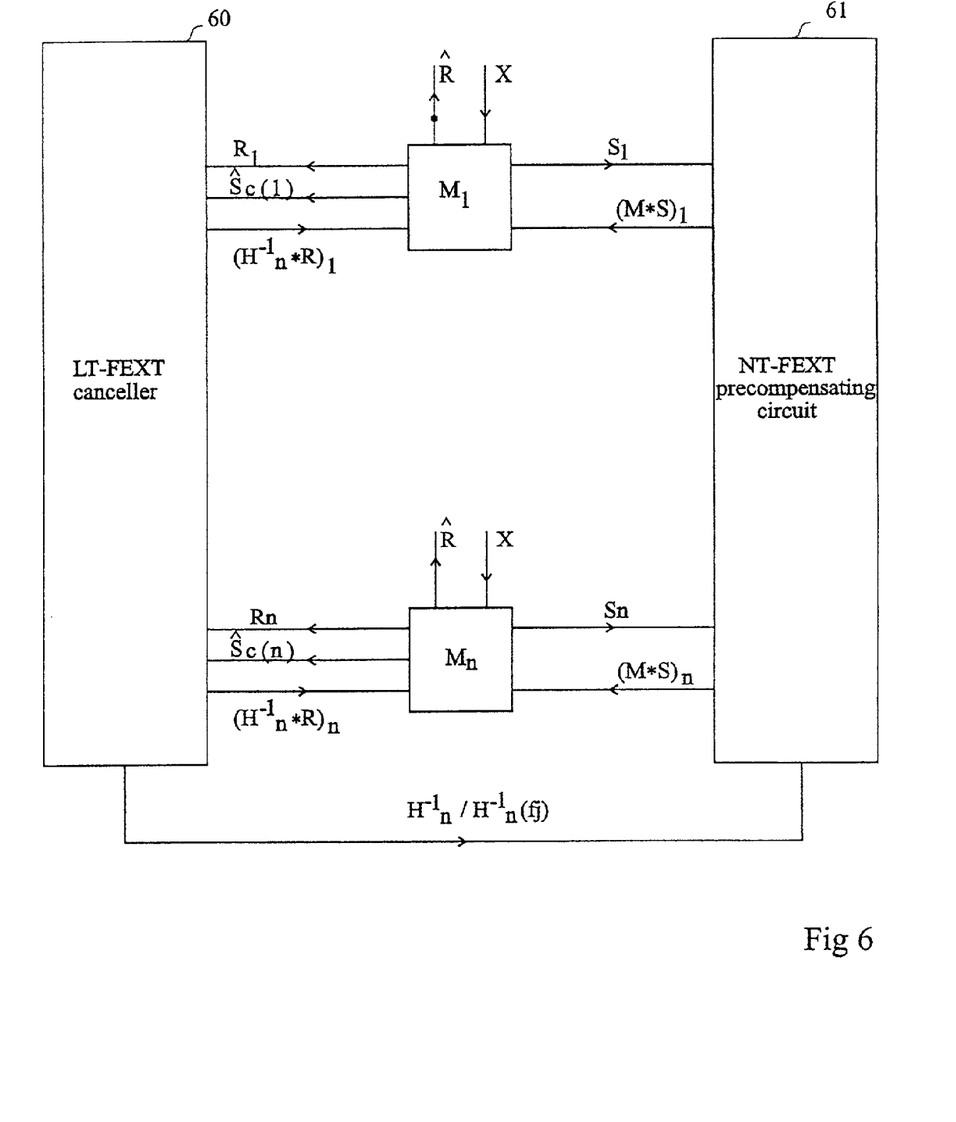
FIG. 6 shows the overall structure of a DSL transmission system using both an LT-FEXT canceller and an NT-FEXT canceller according to the first or the second embodiment of the invention.

As shown in FIG. 6, the coefficients of the transfer matrix can be provided by an external LT-FEXT canceller 60 such as disclosed in a copending U.S. patent application, filed on even date herewith entitled "DSL transmission system with far-end crosstalk cancellation" by the same applicants, which is incorporated herein by reference. Basically, this LT-FEXT canceller adaptively estimates the inverse $H_u^{-1}$ of the transfer matrix of the n upstream (i.e. NT to LT) transmission channels and multiplies the vector of the DMT symbols received by the LT modems by $H_u^{-1}$ for recovering FEXT-free received symbols. Assuming that the downstream transfer matrix $H=H_u^{-1}$, the FEXT precompensating circuit 61 can directly use the estimated matrix output by the LT-FEXT canceller as matrix H.

When there is no symmetry, one can also estimate H−1 or H, respectively $H(fj)^{-1}$ or $H(fj)$ as mentioned hereafter, by an adaptative algorithm minimizing a quadratic error (for example by a least mean square method). The method comprises calculating the error $$e_k^2 = \|R_k - \hat{S}_k\|^2 = \|(H.\hat{H}^{-1}.S)_k - \hat{S}_k\|^2$$

on the NT side and in sending back this error to the LT side for updating the coefficients of $\hat{H}^{-1}$ (here, k is not the time index but a specific value of S).

A second embodiment of the FEXT precompensating circuit is hereafter described in connection with FIG. 3B.

In a conventional DMT transmission system, the FEXT generated at a frequency fj depends also upon frequency components transmitted at neighboring frequencies since the limited duration of the time domain blocks causes a spreading of the frequency components. It is now assumed that the FEXT generated at a frequency fj depends only upon components transmitted at the same frequency (intra-frequency FEXT).

If the modems are synchronous Zipper modems as described in the international application WO97/06619, which is incorporated herein by reference, the assumption made above is fully valid, i.e. the FEXT at a frequency fj is independent from the frequency components transmitted at the frequencies fi, i≠j. Indeed, in such modems, the suffix appended to each time domain block before transmission eliminates any inter-frequency crosstalk.

With the intra-frequency crosstalk assumption the matrix calculations are simplified: if the components at each frequency fj of the DMT symbols Si (resp. Ri) in vector S (resp. R) are grouped together, the transfer matrix H exhibits the form of a diagonal block matrix with N matrices H(fj) along its diagonal, the intra-frequency crosstalk H(fj) matrices having n*n coefficients. The inversion of the matrix H and the multiplication M*S can thus be performed sequentially frequency by frequency.

In this embodiment a sequence controller 34' controls an address generator 35', parallel to serial converters 36-1' to 36-n', serial to parallel converters 37-1' to 37-n', and generates the insertion control clock CKin and the tone clock CKt for all the LT modems i.

The memory 31' is organized in planes, each plane storing a matrix H(fj). The matrices H(fj) are sequentially retrieved and inverted in matrix inverter 32'. The inverted matrices H−1(fj) are sequentially provided to matrix multiplier 33'.

The DMT symbols Si are each provided to a parallel to serial converter 36-i' controlled by the sequence controller 34'. The N components Si(fj), j=1 to N, are sequentially output by the parallel to serial converters and the matrix multiplier 33' sequentially calculates the matrix products $H^{-1}(fj)*S(fj)$, where S(fj) is the vector S(fj)=(Si(fj)), i=1 to n. The components $[H-1(fj)*S(fj)]_i$ of the vector provided by the matrix multiplier 33' are then each transformed by serial to parallel converters 36-i' into DMT symbols $(H-1*S)_i$.

Figure 4:
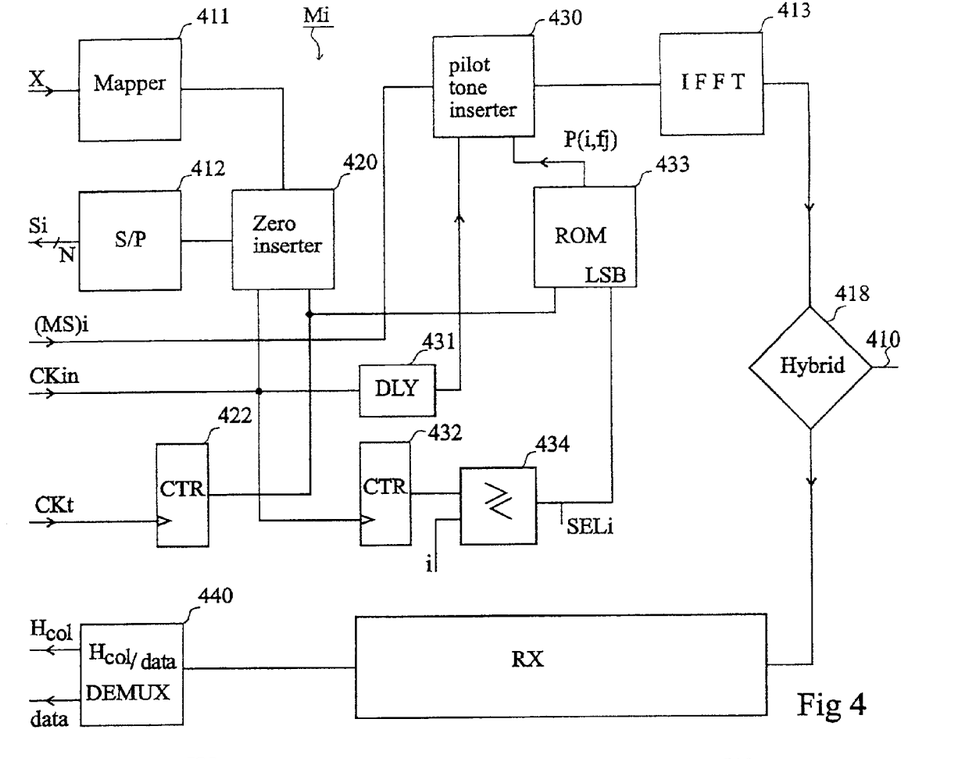
FIG. 4 shows the structure of a modem on the LT side suitable for use with a FEXT canceller according to the second embodiment of the invention.

FIG. 4 shows an LT-modem Mi for use with a FEXT precompensating circuit according to the second embodiment of the invention.

The structure of this modem is similar to the one shown in FIG. 1, the identical elements bearing translated references. After mapping, the complex components are provided to a zero inserter inserting a zero component on a rising edge of signal CKin at a location given by a modulo N counter 422 clocked by the signal CKt. The complex components are then converted into a DMT symbol Si by a serial to parallel converter 412 and Si is provided to a precompensating circuit 30'. The DMT symbol (H−1*S)i output by the precompensating circuit is provided to a pilot tone inserter circuit 430 which inserts a pilot tone component P(i,fj) on a rising edge of the signal CKin delayed by the delay 431. The modulo N counter 422 provides the more significative bit (MSB) of a read address to ROM 433, the least significative bit (LSB) of the address being given by a signal SELi which indicates whether the modem is selected. This signal can be directly generated by the sequencer or, preferably, provided by a comparator 434 comparing the rank i of the modem Mi with the output of a modulo n counter 432 clocked by Ckin. The data P(i,fj) stored at the read address are supplied to the pilot tone inserter 430 which inserts the pilot tone value P(i,fj) as a component at frequency component fj of the DMT symbol Si on the rising edge of the delayed signal CKin. The DMT symbol is then frequency-time transformed by the IFFT circuit 413 as usual.

On the receiving side of the modem Mi, the block RX is identical to the block RX of the modem illustrated in FIG. 1. The data output by RX are provided to a demultiplexer which separates the received coefficients Hik from the data as explained further below.

In normal transmitting mode the signals CKin and CKt are low, no zero is inserted by the zero inserter 420 and no pilot tone value is inserted by the inserter 430. The data X are normally mapped and then parallelized into DMT symbols Si. The precompensated DMT symbol $(H^{-1}*S)_i$ received from the precompensating circuit 30' is also directly fed to the IFFT circuit.

In mixed transmitting/updating mode, the zero inserter inserts a zero complex value at the location j given by the counter 422. This is done simultaneously for all the modems Mi. Each Si carries therefore N−1 normally mapped data and a zero at the frequency fj. All the precompensated DMT symbols $(H^{-1}*S)_i$ received from the precompensating circuit 30' have therefore also a zero as component at frequency fj. In each modem Mi, this zero is replaced by the pilot tone inserter with a complex value P(i,fj)=0 if SELi=0 and P(i,fj)=pj if SELi=1, where pj is a predetermined complex number depending upon the frequency fj only. The modems M1, M2 . . . Mn are selected in turn at the frequency of CKin. A further CKt pulse increments j and the whole insertion process is repeated again at the new frequency fj.

If the current counter value is j0 and if the modem Mi0 is selected, the n components at frequency fj0 of the DMT symbols received by the NT modems Mc(i) constitute the i0-th column of the matrix H(fj0) multiplied by pj0. The NT modems Mc(i) can therefore transmit the matrix coefficients $H_{i0i}(fj0)$ to the LT modems Mi, each coefficient being for example preceded by a predetermined header. Demultiplexer 440 in LT modem Mi detects this header and extracts the coefficient $H_{i0i}(fj0)$. The column vector $(H_{i0i}(fj0))$, i=1 to n, is sent to the precompensating means 30' and stored at the i0-th column of the j0-th plane of memory 31'.

Figure 3B:
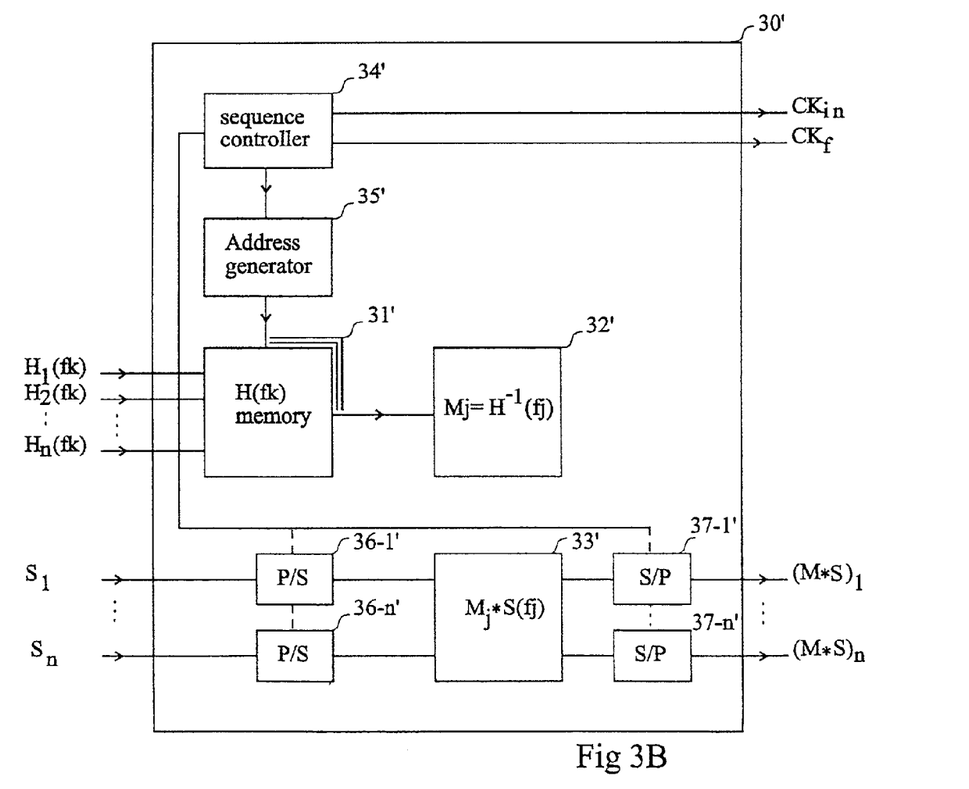
FIG. 3B shows a second embodiment of a first canceller according to the invention.
Figure 5:
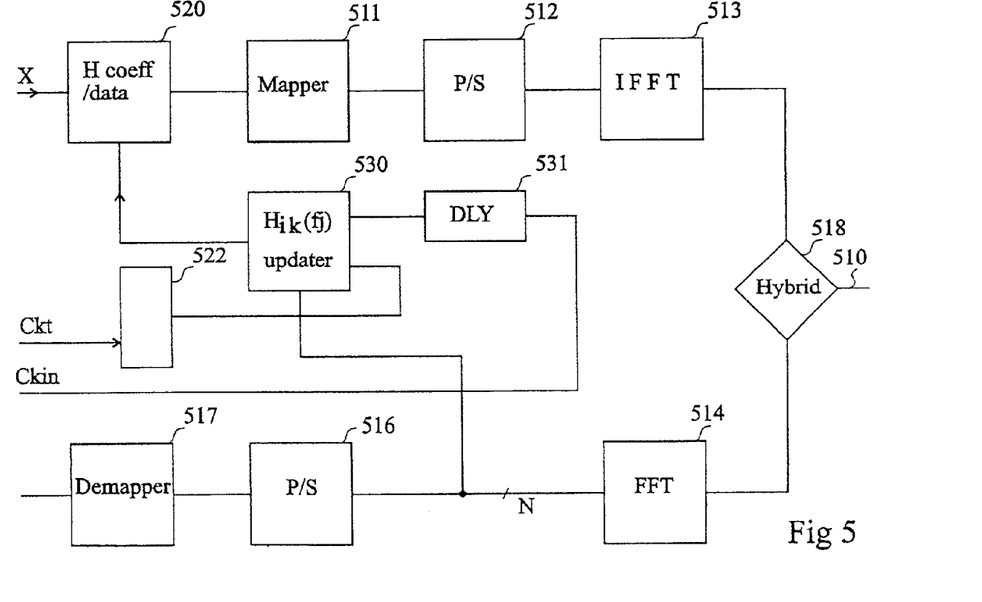
FIG. 5 shows the structure of a modem on the NT side suitable for use with a FEXT canceller according to the second embodiment of the invention.

FIG. 5 shows the structure of an NT modem which can be used with the precompensating circuit of FIG. 3B and LT modems of FIG. 4. The structure of this modem is similar to the one shown in FIG. 1, the identical elements bearing translated references. In contrast with the latter, the NT modem comprises a multiplexer 520, updating means 530, a modulo N counter 522 and has no equalizer. It is assumed that the NT side is provided with a sequence controller synchronized with the controller 34' and having the same sequence pattern.

The updating means 530 receives a value j0 from the modulo N counter 522 clocked by CKt and the signal Ckin delayed by delay 531. In updating/transmitting mode, the updating means 530 extracts on a rising edge of Ckin the component at frequency j0 of the received DMT symbol output by the FFT block 514. The updating means 530 compares the coefficient $H_{i0i}(fj0)$ with the last coefficient $H_{i0i}(fj0)$ previously obtained. If the absolute value of the difference is greater than a given threshold Thj0, which in general is a function of frequency fj0, the new coefficient is appended to a header and transmitted via multiplexer 520 to the LT modem Mi.

Turning back to FIG. 3B, similarly to the first embodiment, the columns of the matrices H(fj) can also be directly provided by an external LT-FEXT canceller as shown in FIG. 6. With the assumption of intra-frequency FEXT the LT-FEXT canceller has a is simplified structure. In such an instance, as disclosed in the above cited copending application, the LT-FEXT canceller estimates the matrices $H_u^{-1}(fj)$ for j=1 to N. These matrices can be used as the precompensating matrices H(fj).

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A far-end crosstalk canceling circuit for a digital subscriber line transmission system, said transmission system comprising a plurality of line termination modems transmitting discrete multitone symbols to corresponding network termination modems over a plurality of transmission channels, comprising precompensation means multiplying, before transmission, a vector $S=(Si)$, $i=1$ to n, by a precompensation matrix such that the matrix product $H*M$ is diagonal, H being a transfer matrix of the plurality of transmission channels defined by $R=H*S$, where $R=(Ri)$, $i=1$ to n, is the vector of the digital transmission symbols Ri respectively received by the modems.

2. The far-end crosstalk canceling circuit of claim 1, further comprising:
   storing means storing said transfer matrix;
   inversion means inverting said transfer matrix and providing the precompensation means with the inverted matrix.

3. The far-end crosstalk canceling circuit according to claim 2 wherein said storing means is organized in planes.

4. A far-end crosstalk canceling circuit for a digital subscriber line transmission system, said transmission system comprising a plurality of line termination modems transmitting discrete multitone symbols to corresponding network termination modems over a plurality of transmission channels, comprising precompensation means multiplying, before transmission, a vector $S=(Si)$, $i=1$ to n, by a precompensation matrix such that the matrix product $H*M$ is diagonal, H being a transfer matrix of the plurality of transmission channels defined by $R=H*S$, where $R=(Ri)$, $i=1$ to n, is the vector of the digital transmission symbols Ri respectively received by the modems;
   further comprising:
   storing means storing transfer matrices of the plurality of transmission channels at tones being defined by $R(fj)=H(fj)*S(fj)$, where $R(fj)$ is the vector $R(fj)$ $(Ri(fj))$ $i=1$ to n and $S(fj)$ is the vector $S(fj)=(Si(fj))$, $i=1$ to n, $Ri(fj)$ and $Si(fj)$ being the components at tone fj of the received discrete multitone symbol Ri and transmitted discrete multitone symbol Si respectively; and
   inversion means sequentially inverting said transfer matrices $H(fj)$ and supplying the precompensation means with an inverted matrices $H^{-1}(fj)$, the precompensation means sequentially calculates the products $H^{-1}(fj)*S(fj)$.

5. A digital subscriber line transmission system comprising a plurality of line termination modems transmitting discrete multitone symbols Si to corresponding network termination modems over n transmission channels, comprising:
   a far-end crosstalk canceling circuit according to claim 4 canceling far-end crosstalk at the network termination side of said system; and
   a line termination far-end crosstalk canceling circuit canceling far-end crosstalk at the line termination side of said system by estimating the inverse of the transfer matrices (fj) of the plurality of transmission channels in the upstream direction at tone fj, said line termination far-end crosstalk canceling circuit supplying the storing means of said far-end crosstalk canceling circuit with $H(fj)=H^{-1}_{up}(fj)$.

6. A digital subscriber line transmission system comprising a plurality of line termination modems transmitting discrete multitone symbols Si to corresponding network termination modems over n transmission channels, further comprising a far-end crosstalk canceling circuit according to claim 4 canceling far-end crosstalk at the network termination side of said system;
   each LT modem comprises inserting means for inserting at predetermined times known symbols $P(i,fj)$ as components at tone fj of multitone symbols Si;
   each network termination modem comprises means for detecting at said predetermined times the components $Rk(fj)$ and for deriving therefrom the coefficients $H_{ik}(fj)$ of the transfer matrix $H(fj)$;
   each network termination modem further comprises a multiplexer for multiplexing data to be transmitted with said coefficients $H_{ik}(fj)$;
   each line termination modem further comprises a demultiplexer for extracting from the received data said coefficients $H_{ik}(fj)$.

7. A far-end crosstalk canceling circuit for a digital subscriber line transmission system, said transmission system comprising a plurality of line termination modems transmitting discrete multitone symbols to corresponding network termination modems over a plurality of transmission channels, comprising precompensation means multiplying, before transmission, a vector $S=(Si)$, $i=1$ to n, by a precompensation matrix such that the matrix product $H*M$ is diagonal, H being a transfer matrix of the plurality of transmission channels defined by $R=H*S$, where $R=(Ri)$, $i=1$ to n, is the vector of the digital transmission symbols Ri respectively received by the modems; and
   a digital subscriber line transmission system comprising a plurality of line termination modems transmitting discrete multitone symbols Si to corresponding network termination modems over n transmission channels, comprising:
   the far-end crosstalk canceling circuit canceling far-end crosstalk at the network termination side of said system; and
   a line termination far-end crosstalk canceling circuit canceling far-end crosstalk at the line termination side of said system by estimating an inverse of the transfer matrix $H^{-1}_{up}$ of the plurality of the transmission channels in an upstream direction, said line termination far-end crosstalk canceling circuit supplying an storing means of said far-end crosstalk canceling circuit with $H=H^{-1}_{up}$.

8. A far-end crosstalk canceling method for a digital subscriber line transmission system, said transmission system comprising a plurality of line termination modems transmitting discrete multitone symbols Si to corresponding network termination modems over n transmission channels, wherein a vector $S=(Si)$, $i=1$ to n, is multiplied, before transmission, by a precompensation matrix M such that the matrix product $H*M$ is diagonal, H being a transfer matrix of the n transmission channels defined by $R=H*S$, where $R=(Ri)$, $i=1$ to n, is the vector of the discrete multitone symbols Ri respectively received by the modems.

9. The far-end crosstalk canceling method of claim 8, wherein:
   said transfer matrix is stored in storing means;
   said transfer matrix is then retrieved and inverted; and
   the inverted matrix is used as precompensation matrix M.

10. A far-end crosstalk canceling method for a digital subscriber line transmission system, said transmission system comprising a plurality of line termination modems transmitting discrete multitone symbols Si to corresponding network termination modems over n transmission channels, wherein a vector $S=(Si)$, $i=1$ to n, is multiplied, before transmission, by a precompensation matrix M such that the matrix product H*M is diagonal, H being a transfer matrix of the n transmission channels defined by R=H*S, where R=(Ri), i=1 to n, is the vector of the discrete multitone symbols Ri respectively received by the modems;

wherein:

transfer matrices H(fj) of the n transmission channels at tones fj are stored in storing means, H(fj) being defined by R(fj)=H(fj)*S(fj) where R(fj) is the vector R(fj)=(Ri(fj)), i=1 to n, and S(fj) is the vector S(fj)=(Si(fj)), i=1 to n, Ri(fj) and Si(fj) being the components at tone fj of the received discrete multitone symbol Ri and transmitted discrete multitone symbol Si respectively;

said transfer matrices H(fj) are retrieved and inverted;

the inverted matrices $H^{-1}$(fj) are used as precompensating matrices at tones fj.

11. The far-end crosstalk canceling method of claim 10, wherein:

for each line termination modem, known symbols P(i,fj) are inserted at predetermined times as components at tone fj of multitone symbols Si;

for each network termination modem, the components Rk(fj) are detected at said predetermined times, the coefficients $H_{ik}$(fj) of transfer matrix H(fj) are derived therefrom and multiplexed with the data to be transmitted;

for each modem, said coefficients $H_{ik}$(fj) are extracted from the received data.

12. A far-end crosstalk canceling circuit for a data transmission system comprising a precompensation circuit multiplying, before transmission, a vector S=(Si), i=1 to n, by a precompensation matrix such that the matrix product H*M is diagonal, H being a transfer matrix of a plurality of transmission channels defined by R=H*S, where R=(Ri), i=1 to n, is the vector of the digital transmission symbols Ri respectively received by a modem.

13. The far-end crosstalk canceling circuit of claim 12, further comprising:

a storage circuit storing said transfer matrix;

an inversion circuit inverting said transfer matrix and providing the precompensation circuit with the inverted matrix.

14. The far-end crosstalk canceling circuit according to claim 13 wherein said storage circuit is organized in planes.

15. A far-end crosstalk canceling circuit for a data transmission system comprising a precompensation circuit multiplying, before transmission, a vector S=(Si), i=1 to n, by a precompensation matrix such that the matrix product H*M is diagonal, H being a transfer matrix of the plurality of transmission channels defined by R=H*S, where R=(Ri), i=1 to n, is the vector of the digital transmission symbols Ri respectively received by a modem;

further comprising:

a storage circuit storing transfer matrices of the plurality of transmission channels at tones being defined by R(fj) H(fj)*S(fj), where R(fj) is the vector R(fj)=(Ri(fj)) i=1 to n and S(fj) is the vector S(fj)=(Si(fj)), i=1 to n, Ri(fj) and Si(fj) being the components at tone fj of the received discrete multitone symbol Ri and transmitted discrete multitone symbol Si respectively; and an inversion circuit sequentially inverting said transfer matrices H(fj) and supplying the precompensation circuit with the inverted matrices $H^{-1}$(fj), the precompensation circuit sequentially calculating the products $H^{-1}$(fj)*S(fj).

16. A data transmission system comprising a plurality of line termination modems transmitting discrete multitone symbols Si to corresponding network termination modems over n transmission channels, comprising:

a far-end crosstalk canceling circuit according to claim 15 canceling far-end crosstalk at the network termination side of said system; and a line termination far-end crosstalk canceling circuit canceling far-end crosstalk at the line termination side of said system by estimating the inverse of the transfer matrices $H^{-1}_{up}$(fj) of the plurality of transmission channels in the upstream direction at tone fj, said line termination far-end crosstalk canceling circuit supplying the storage circuit of said far-end crosstalk canceling circuit with $H(fj)=H^{-1}_{up}$(fj).

17. A data transmission system comprising a plurality of line termination modems transmitting discrete multitone symbols Si to corresponding network termination modems over n transmission channels, further comprising a far-end crosstalk canceling circuit according to claim 15 canceling far-end crosstalk at the network termination side of said system, wherein:

each LT modem comprises an insertion circuit for inserting at predetermined times known symbols P(i,fj) as components at tone fj of multitone symbols Si;

each network termination modem comprises a detection circuit for detecting at said predetermined times the components Rk(fj) and for deriving therefrom the coefficients $H_{ik}$(fj) of the transfer matrix H(fj);

each network termination modem further comprises a multiplexer for multiplexing data to be transmitted with said coefficients $H_{ik}$(fj); and each line termination modem further comprises a demultiplexer for extracting from the received data said coefficients $H_{ik}$(fj).

18. A far-end crosstalk canceling circuit for a data transmission system comprising a precompensation circuit multiplying, before transmission, a vector S=(Si), i=1 to n, by a precompensation matrix such that the matrix product H*M is diagonal, H being a transfer matrix of a plurality of transmission channels defined by R=H*S, where R=(Ri), i=1 to n, is the vector of the digital transmission symbols Ri respectively received by a modem; and a data transmission system comprising a plurality of line termination modems transmitting discrete multitone symbols Si to corresponding network termination modems over n transmission channels, comprising:

a far-end crosstalk canceling circuit, canceling far-end crosstalk at the network termination side of said system; and a line termination far-end crosstalk canceling circuit canceling far-end crosstalk at the line termination side of said system by estimating an inverse of the transfer matrix $H^{-1}_{up}$ of the plurality of the transmission channels in an upstream direction, said line termination far-end crosstalk canceling circuit supplying an storage circuit of said far-end crosstalk canceling circuit with $H=H^{-1}_{up}$.

19. A far-end crosstalk canceling method for a data transmission system, said data transmission system comprising a plurality of line termination modems transmitting discrete multitone symbols Si to corresponding network termination modems over n transmission channels, wherein a vector S=(Si), i=1 to n, is multiplied, before transmission, by a precompensation matrix M such that the matrix product H*M is diagonal, H being a transfer matrix of the n transmission channels defined by R=H*S, where R=(Ri), i=1 to n, is the vector of the discrete multitone symbols Ri respectively received by the modems.

20. The far-end crosstalk canceling method of claim 19, further comprising:
inverting the transfer matrix H to produce the precompensation matrix M.

21. A far-end crosstalk canceling method for a data transmission system, said data transmission system comprising a plurality of line termination modems transmitting discrete multitone symbols Si to corresponding network termination modems over n transmission channels, wherein a vector S=(Si), i=1 to n, is multiplied, before transmission, by a precompensation matrix M such that the matrix product H*M is diagonal, H being a transfer matrix of the n transmission channels defined by R=H*S, where R=(Ri), i=1 to n, is the vector of the discrete multitone symbols Ri respectively received by the modems; and
further comprising:
for transfer matrices H(fj) of the n transmission channels at tones fj, H(fj) being defined by R(fj)=H(fj)*S(fj) where R(fj) is the vector R(fj)=(Ri(fj)), i=1 to n, and S(fj) is the vector S(fj)=(Si(fj)), i=1 to n, Ri(fj) and Si(fj) being the components at tone fj of the received discrete multitone symbol Ri and transmitted discrete multitone symbol Si respectively,
inverting the transfer matrices H(fj) to produce inverted matrices $H^{-1}$(fj), which are used as precompensating matrices at tones fj.

22. The far-end crosstalk canceling method of claim 21, further comprising:
inserting known symbols P(i,fj) at predetermined times as components at tone fj of multitone symbols Si;
detecting the components Rk(fj) at said predetermined times, the coefficients $H_{ik}$(fj) of transfer matrix H(fj) being derived therefrom and multiplexed with the data to be transmitted; and
extracting said coefficients $H_{ik}$(fj) from the received data.

23. A modem comprising a far-end crosstalk canceling circuit, said far-end crosstalk canceling circuit comprising a precompensation circuit multiplying, before transmission, a vector S=(Si), i=1 to n, by a precompensation matrix such that the matrix product H*M is diagonal, H being a transfer matrix of a plurality of transmission channels defined by R=H*S, where R=(Ri), i=1 to n, is the vector of the digital transmission symbols Ri respectively received by the modem.

24. The modem of claim 23, wherein the far-end crosstalk canceling circuit further comprises:
a storage circuit storing said transfer matrix;
an inversion circuit inverting said transfer matrix and providing the precompensation circuit with the inverted matrix.

25. The far-end crosstalk canceling circuit according to claim 24 wherein the storage circuit is organized in planes.

26. A modem comprising a far-end crosstalk canceling circuit, said far-end crosstalk canceling circuit comprising a precompensation circuit multiplying, before transmission, a vector S=(Si), i=1 to n, by a precompensation matrix such that the matrix product H*M is diagonal, H being a transfer matrix of a plurality of transmission channels defined by R=H*S, where R=(Ri), i=1 to n, is the vector of the digital transmission symbols Ri respectively received by a modem;
wherein the far-end crosstalk canceling circuit further comprises:
a storage circuit storing transfer matrices of the plurality of transmission channels at tones being defined by R(fj)=H(fj)*S(fj), where R(fj) is the vector R(fj) (Ri(fj)) i=1 to n and S(fj) is the vector S(fj)=(Si(fj)), i=1 to n, Ri(fj) and Si(fj) being the components at tone fj of the received discrete multitone symbol Ri and transmitted discrete multitone symbol Si respectively; and
an inversion circuit sequentially inverting said transfer matrices H(fj) and supplying the precompensation circuit with the inverted matrices $H^{-1}$(fj), the precompensation circuit sequentially calculating the products $H^{-1}$(fj)*S(fj).

27. The far-end crosstalk canceling circuit according to claim 26 further comprising a counting circuit for performing frequency-time signal transformation.

28. A data transmission system comprising a plurality of line transmission modems transmitting discrete multitone symbols Si to corresponding network termination modems over n transmission channels, including means for precompensating for far-end crosstalk;
wherein the means for precompensating for far-end crosstalk further comprise means for multiplying, before transmission, a vector S=(Si), i=1 to n, by a precompensation matrix M such that the diagonal of the product equals H*M, where H is a transfer matrix of the plurality of transmission channels defined by R=H*S, where R=(Ri), i=1 to n, is the vector of the digital transmission symbols Ri respectively received by the modems.

29. The data transmission system according to claim 28, further comprising means for estimating an inverse $H^{-1}_{up}$ of the transfer matrix $H_{up}$ of the n transmission channels.

30. The data transmission system according to claim 29, further comprising means for storing $H^{-1}_{up}$.

31. The data transmission system according to claim 28, further comprising means for storing transfer matrices of the plurality of transmission channels at tones being defined by R(fj)=H(fj)*S(fj), where R(fj) is the vector R(fj)=(Ri(fj)) i=1 to n and S(fj) is the vector S(fj)=(Si(fj)), i=1 to n, Ri(fj) and Si(fj) being the components at tone fj of the received discrete multitone symbol and transmitted discrete multitone symbol respectively.

32. The data transmission system according to claim 31, further comprising means for sequentially inverting said transfer matrices H(fj) and supplying said means for precompensating with the inverted matrices $H^{-1}$(fj) for sequential calculation of the products $H^{-1}$(fj)*S(fj).

33. The data transmission system of claim 32 further comprising:
means for inserting at origin at predetermined times known symbols P(i,fj) as components at tone fj of multitone symbols Si;
means for detecting at destination at said predetermined times the components Rk(fj) and for deriving therefrom the coefficients $H_{ik}$(fj) of the transfer matrix H(fj);
means for multiplexing data to be transmitted from destination to origin with the coefficients $H_{ik}$(fj); and
means for extracting from the data received at origin said coefficients $H_{ik}$(fj).

* * * * *

UNITED STATES PATENT AND TRADEMARK OFFICE
CERTIFICATE OF CORRECTION

| | | |
|---|---|---|
| PATENT NO. | : 7,023,908 B2 | Page 1 of 1 |
| APPLICATION NO. | : 09/736790 | |
| DATED | : April 4, 2006 | |
| INVENTOR(S) | : Tomas Nordstrom, Daniel Bengtsson and Olivier Isson | |

It is certified that error appears in the above-identified patent and that said Letters Patent is hereby corrected as shown below:

Column 6,
Line 54, should read -- LT-FEXT canceller has a simplified structure. In such an --.

Column 10,
Line 54, should read -- far end crosstalk canceling circuit supplying a storage --.

Signed and Sealed this

Twenty-seventh Day of June, 2006

JON W. DUDAS
*Director of the United States Patent and Trademark Office*